(12) United States Patent
Linkner, Jr. et al.

(10) Patent No.: US 6,213,572 B1
(45) Date of Patent: Apr. 10, 2001

(54) ELECTRO-HYDRAULIC BRAKE SYSTEM WITH ELECTRONIC PEDAL SIMULATION

(75) Inventors: Herbert L. Linkner, Jr., Dexter; Wendell D. Tackett, Ann Arbor, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/016,149

(22) Filed: Jan. 30, 1998

Related U.S. Application Data
(60) Provisional application No. 60/036,033, filed on Jan. 31, 1997.

(51) Int. Cl.$^7$ ........................................................ B60T 8/32
(52) U.S. Cl. .................... 303/155; 303/119.2; 303/113.4
(58) Field of Search .............................. 303/119.2, 113.4, 303/155, 119.3

(56) References Cited

U.S. PATENT DOCUMENTS

| | | | |
|---|---|---|---|
| 4,462,642 | | 7/1984 | Leiber . |
| 5,443,309 | * | 8/1995 | Beck ................................. 303/119.2 |
| 5,511,862 | * | 4/1996 | Fujioka ............................. 303/113.4 |
| 5,542,755 | * | 8/1996 | Staib et al. ........................ 303/119.2 |
| 5,709,438 | * | 1/1998 | Isakson et al. .................... 303/113.4 |
| 5,730,509 | * | 3/1998 | Eith et al. ......................... 303/119.2 |
| 5,836,334 | * | 11/1998 | Mittwollen et al. .............. 303/119.2 |

FOREIGN PATENT DOCUMENTS

| | | | |
|---|---|---|---|
| 4127578 | * | 2/1993 | (DE) ................................. 303/119.2 |
| 44 13 579 A1 | | 10/1995 | (DE) . |

OTHER PUBLICATIONS

"Electrohydraulic Brake System—The First Approach to Brake–By–Wire Technology" by Jonner et al., SAE Technical Paper Series #960991, copyright 1996 Society of Automotive Engineers, Inc.

"Intelligent Braking for Current and Future Vehicles" by Schenk et al., SAE Technical Paper Series #950762, copyright 1995 Society of Automotive Engineers, Inc.

\* cited by examiner

Primary Examiner—Matthew C. Graham
(74) Attorney, Agent, or Firm—MacMillan, Sobanski & Todd, LLC

(57) ABSTRACT

This invention relates to an electro-hydraulic brake-by-wire system including a hydraulic pump and a plurality of valves to achieve a demanded braking force, and to achieve a desired brake pedal feel. The brake system includes a plurality of wheel brakes, a reservoir of hydraulic fluid, and a pump for selectively pumping hydraulic fluid from the reservoir and supplying pressurized hydraulic fluid to the wheel brakes for applying a braking force. The pump acts as a source of pressurized hydraulic fluid to the wheel brakes during normal brake apply, as well as during advanced braking functions as Antilock Braking (ABS), Traction Control (TC), or Vehicle Stability Control (VSC). An apply valve is associated with each of the wheel brakes for selectively permitting flow of pressurized hydraulic fluid from the pump to the associated wheel brake. A dump valve is associated with each of the wheel brakes for selectively permitting flow of pressurized hydraulic fluid from the associated wheel brake to the reservoir. A master cylinder is operated by a brake pedal for pressurizing hydraulic fluid. An isolation valve is associated with each of the wheel brakes for selectively preventing flow of pressurized hydraulic fluid from the master cylinder to the associated wheel brake. A sensor senses the position of the brake pedal and generates a pedal position signal representative of the position of the brake pedal. An electronic control unit receives the pedal position signal, which signal is utilized to determine a brake demand. The electronic control unit controls the operation of the pump, and the apply, dump, and isolation valves associated with each wheel brake to achieve a desired braking force at each wheel brake based on the brake demand and to regulate pressure generated by the master cylinder to achieve a predetermined relationship between the pressure generated by the master cylinder and the position of the brake pedal, whereby a desired pedal feel is achieved.

10 Claims, 7 Drawing Sheets

ELECTRO-HYDRAULIC BRAKE SYSTEM WITH ELECTRONIC PEDAL SIMULATION

CROSS REFERENCE TO RELATED APPLICATIONS

This application claims the benefit of U.S. Provisional Application No. 60/036,033 filed Jan. 31, 1997.

BACKGROUND OF THE INVENTION

This invention relates in general to an electronically controlled hydraulic brake actuation system for automobiles, and more specifically to a brake by wire system in which the vehicle wheel brakes are not normally hydraulically connected to the brake pedal. In such a system, brake pedal feel (pedal travel versus pedal force characteristics) is normally independent of wheel brake characteristics.

In conventional hydraulic vehicle brake systems, the force used to pressurize hydraulic fluid to operate the vehicle brakes comes from the vehicle operator pressing on the vehicle brake pedal to actuate the master cylinder of the brake systems. Normally, the resultant movement of the brake pedal linkage to the master cylinder is also used to actuate a vacuum or hydraulic boost system to provide an assisting for which aids the force provided by the vehicle operator in actuating the master cylinder and thus operate the vehicle brakes.

In certain recent advanced vehicle brake systems, such as so-called brake-by-wire brake systems, it is known to supply all of the force to operate the vehicle brakes from mechanical devices such as pumps or electrical linear actuators. When the mechanical device is a pump, the pressure generated by the pump and applied to the wheel brake will frequently be regulated by valves interposed between the pump and the wheel brakes. An example of such a brake-by-wire system is described in German Patent Application DE 44 13 579 A1.

In some known brake-by-wire systems, the vehicle brake pedal is connected to sensors providing signals used to control the operation of these mechanical devices supplying the force for operating the vehicle brakes. Such sensors typically measure the amount of movement of the brake pedal, the force with which the operator steps on the brake pedal, or both. Since the brake pedal does not actuate the vehicle brakes, it is common to provide a pedal simulator (also known as a compliance unit) to provide a simulated load on the brake pedal which provides a reaction force to the operation of the brake pedal similar to that experienced during the operation of a brake pedal in a conventional brake system. By providing a simulated load on the brake pedal similar to that experienced during the operation of a brake pedal in a conventional brake system, the transition from conventional brake systems to advanced brake systems having a pedal simulator is eased, since the driver of a vehicle with such an advanced brake system will enjoy a "normal" pedal feel. An additional purpose of the simulated load on a brake pedal is to provide a reaction force to the operation of the brake pedal to enable the use of a pedal force sensor as an input to the control of the operation of the mechanical devices supplying the force for operating the vehicle brakes.

SUMMARY OF THE INVENTION

This invention relates to an electro-hydraulic brake-by-wire system including a hydraulic pump and a plurality of valves to achieve a demanded braking force, and to achieve a desired brake pedal feel. The brake system includes a plurality of wheel brakes, a reservoir of hydraulic fluid, and a pump for selectively pumping hydraulic fluid from the reservoir and supplying pressurized hydraulic fluid to the wheel brakes for applying a braking force. The pump acts as a source of pressurized hydraulic fluid to the wheel brakes during normal brake apply, as well as during advanced braking functions as Antilock Braking (ABS), Traction Control (TC), or Vehicle Stability Control (VSC). An apply valve is associated with each of the wheel brakes for selectively permitting flow of pressurized hydraulic fluid from the pump to the associated wheel brake. A dump valve is associated with each of the wheel brakes for selectively permitting flow of pressurized hydraulic fluid from the associated wheel brake to the reservoir. A master cylinder is operated by a brake pedal for pressurizing hydraulic fluid. An isolation valve is associated with each of the wheel brakes for selectively preventing flow of pressurized hydraulic fluid from the master cylinder to the associated wheel brake. A sensor senses the position of the brake pedal and generates a pedal position signal representative of the position of the brake pedal. An electronic control unit receives the pedal position signal, which signal is utilized to determine a brake demand. The electronic control unit controls the operation of the pump, and the apply, dump, and isolation valves associated with each wheel brake to achieve a desired braking force at each wheel brake based on the brake demand and to regulate pressure generated by the master cylinder to achieve a predetermined relationship between the pressure generated by the master cylinder and the position of the brake pedal, whereby a desired pedal feel is achieved.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
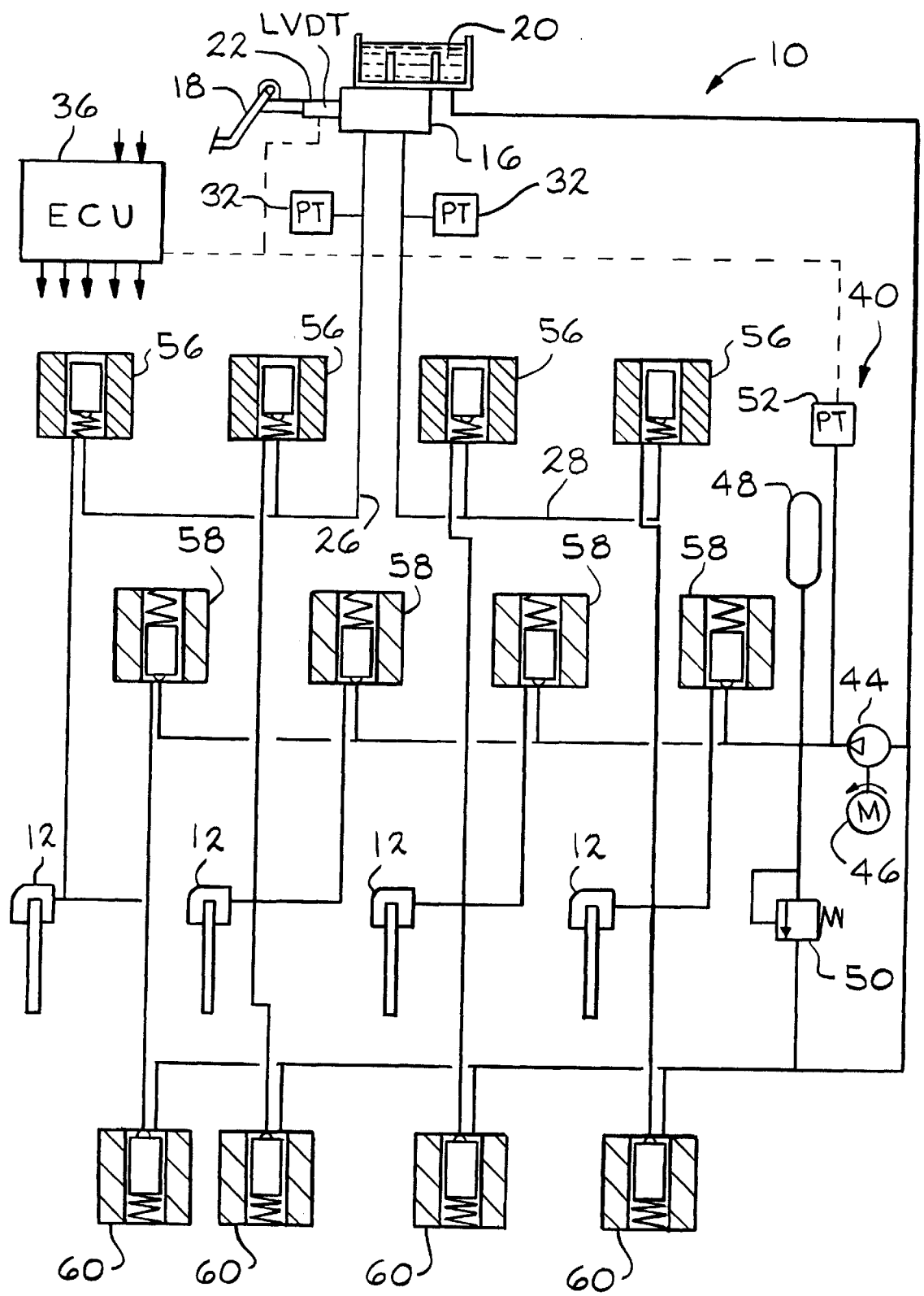
FIG. 1 is a schematic illustration of a first embodiment of a vehicle brake system 10, in accordance with the present invention.

Referring now to the drawings, there is schematically illustrated in FIG. 1 a first embodiment of a vehicle brake system, indicated generally at 10, in accordance with the present invention. The brake system 10 is an electro-hydraulic brake-by-wire vehicle brake system with four wheel brakes 12. As will be further described below, the brake system 10 has electronically controlled pedal simulation. The brake system 10 has a tandem master cylinder 16 which is operated by a brake pedal 18. A hydraulic fluid reservoir 20 is connected to the master cylinder 16 to provide makeup and an expansion volume in the normal manner.

The position of the brake pedal 18 is sensed by a pedal position sensor in the form of an LVDT (Linear Variable Displacement Transformer) 22. The brake system 10 includes a primary brake circuit 26 and a separate secondary brake circuit 28. The primary brake circuit 26 and the secondary brake circuit 28 are hydraulically connected, respectively, to a primary chamber (not shown) and a secondary chamber (not shown) of the tandem master cylinder 16. The tandem master cylinder 16 may be operated by the brake pedal 18 to pressurize hydraulic fluid in the master cylinder 16, and thus in the primary brake circuit 26 and the secondary brake circuit 28 connected to the master cylinder 16. Each of the primary brake circuit 26 and the secondary brake circuit 28 are connected to a respective pressure transducer 32. Each of the pressure transducers 32 generate a respective pressure signal indicative of the pressure out of the master cylinder 16, as sensed in the respective primary brake circuit 26 and secondary brake circuit 28.

The pressure signals produced by the pressure transducers 32 are supplied to an ECU (Electronic Control Unit) 36. The ECU 36 receives the pressure signals from the pressure transducers 32 and the brake position signal from the LVDT 22, processes this information along with other inputs, and, as will be is further described below, controls other portions of the brake system 10 to apply a desired braking force at the wheel brakes 12, and to achieve a desired "pedal feel" when operating the brake pedal 18. Pedal feel, as used in this application, means the pedal travel versus pedal force characteristics of the brake pedal 18 as experienced a driver of the vehicle when stepping on the brake pedal 18 to apply the wheel brakes 12.

The primary brake circuit 26 is hydraulically connected to supply pressurized hydraulic fluid from the primary chamber of the tandem master cylinder 16 to a first pair of the wheel brakes 12. The secondary brake circuit 28 is similarly connected to supply pressurized hydraulic fluid from the secondary chamber of the master cylinder 16 to the remaining pair of the wheel brakes 12. In order to minimize the distance a driver has to depress the brake pedal 18 to achieve a desired amount of braking with the wheel brakes 12, the brake system 10 includes a displacement amplification source indicated generally at 40. The displacement amplification source 40 selectively supplies pressurized hydraulic fluid to the wheel brakes 12 in addition to the pressurized hydraulic fluid supplied from the master cylinder 16 during braking, thereby reducing the amount of pressurized hydraulic fluid which must be supplied from the master cylinder 16 to operate the wheel brakes 12 to achieve a desired amount of braking.

The displacement amplification source 40 includes a hydraulic pump 44 driven by an electric motor 46. The pump 44 discharges pressurized hydraulic fluid into a header 47. The displacement amplification source 40 also includes an accumulator 48 in fluid communication with the header 47 for storing pressurized hydraulic fluid discharged from the pump 44, and a relief valve 50 selectively relieving pressurized hydraulic fluid from the header 47 to the inlet of the pump 44 to provide over-pressure protection for the brake system 10. The inlet of the pump 44 is also in fluid communication with the reservoir 20, which acts as a source of hydraulic fluid to be pumped through the pump 44 and discharged into the header 47 at a relatively high pressure. Preferably internal baffles are provided in the reservoir 20 to provide minimum volumes of hydraulic fluid which are dedicated, respectively, to the use of the displacement amplification source 40, the use of the primary circuit 26, and the use of the secondary circuit 28.

The accumulator 48 stores pressurized hydraulic fluid discharged from the pump 44, enabling the motor 46 driving the pump 44 to be turned off if the pressurized hydraulic fluid is not immediately to be used, thereby saving minimizing electric power use. Note that little or no leakage is expected through the components of the brake system 10 connected to the header 47, so the pressure in the accumulator 48 is expected to remain relatively high for an extended period without running the pump 44. However, if desired, a valve (not shown) may be provided to isolate the accumulator 48 from the header 47 in between periods that pressurized hydraulic fluid is drawn from the accumulator 48 for braking (or added to the accumulator 48), to aid in the retention of the pressure of the hydraulic fluid stored therein.

A pressure transducer 52 is provided to monitor the pressure of the hydraulic fluid in the header 47. The pressure transducer 52 generates a pressure signal which is supplied to the ECU which represents the pressure of pressurized hydraulic fluid supplied by the displacement amplification source 40 through the header 47.

Three sets of valves are used to regulate the pressure of hydraulic fluid supplied to the wheel brakes 12 of the brake system 10. A first set of valves consists of four isolation valves 56. Preferably the isolation valves 56 are normally open. Each isolation valve 56 is associated with a respective wheel brake 12 for selectively isolating the respective wheel brake 12 from the master cylinder 16 during antilock braking (ABS), traction control (TC), or vehicle stability control (VSC) operation of the brake system 10. Preferably the isolation valves 56 are two position, two way (2/2-way) valves, that is, having two operating positions, and two fluid conduit connections with the brake system 10. In an electrically deenergized state, the isolation valve 56 is open, permitting fluid flow through the isolation valve 56 between the associated wheel brake 12 and the master cylinder 16 via one of the primary circuit 26 or the secondary circuit 28. When the isolation valve 56 is electrically energized, the isolation valve 56 is shut to prevent fluid communication between the master cylinder 16 and the associated wheel brake 12. The isolation valves 56 are binary solenoid valves, that is, intended to operate in either the fully open position or the fully shut position, and not in an intermediate throttled position. Each of the isolation valves 56 may be individually operated under the control of the ECU 36.

The second set of valves used to regulate the pressure of hydraulic fluid supplied to the wheel brakes 12 of the brake system 10 consists of four proportional pressure differential apply valves 58. Each of the apply valves 58 is selectively operated by the ECU 36 to permit fluid communication between the header 47 and an associated one of the wheel brakes 12. Preferably, the apply valves 58 supply hydraulic fluid to the wheel brakes 12 from the header 47 at a pressure which is proportional to the current used to energize the apply valves 58. As will be further explained below, the apply valves 58 are operated to amplify (add to) hydraulic fluid supplied to the associated wheel brake 12 from the master cylinder 16 and to control pressure increases to the associated wheel brake 12. Preferably, the apply valves 58 are normally closed (shut when electrically deenergized). The structure and operation of the apply valves 58 are further discussed below.

The third set of valves used to regulate the pressure of hydraulic fluid supplied to the wheel brakes 12 of the brake system 10 consists of four dump valves 60. Each dump valve 60 is selectively operated by the ECU 36 to control pressure decreases at a respective wheel brake 12. Each dump valve 60 is preferably embodied as a spring-biased proportional relief solenoid valve which is normally closed (closed when deenergized).

Figure 2:
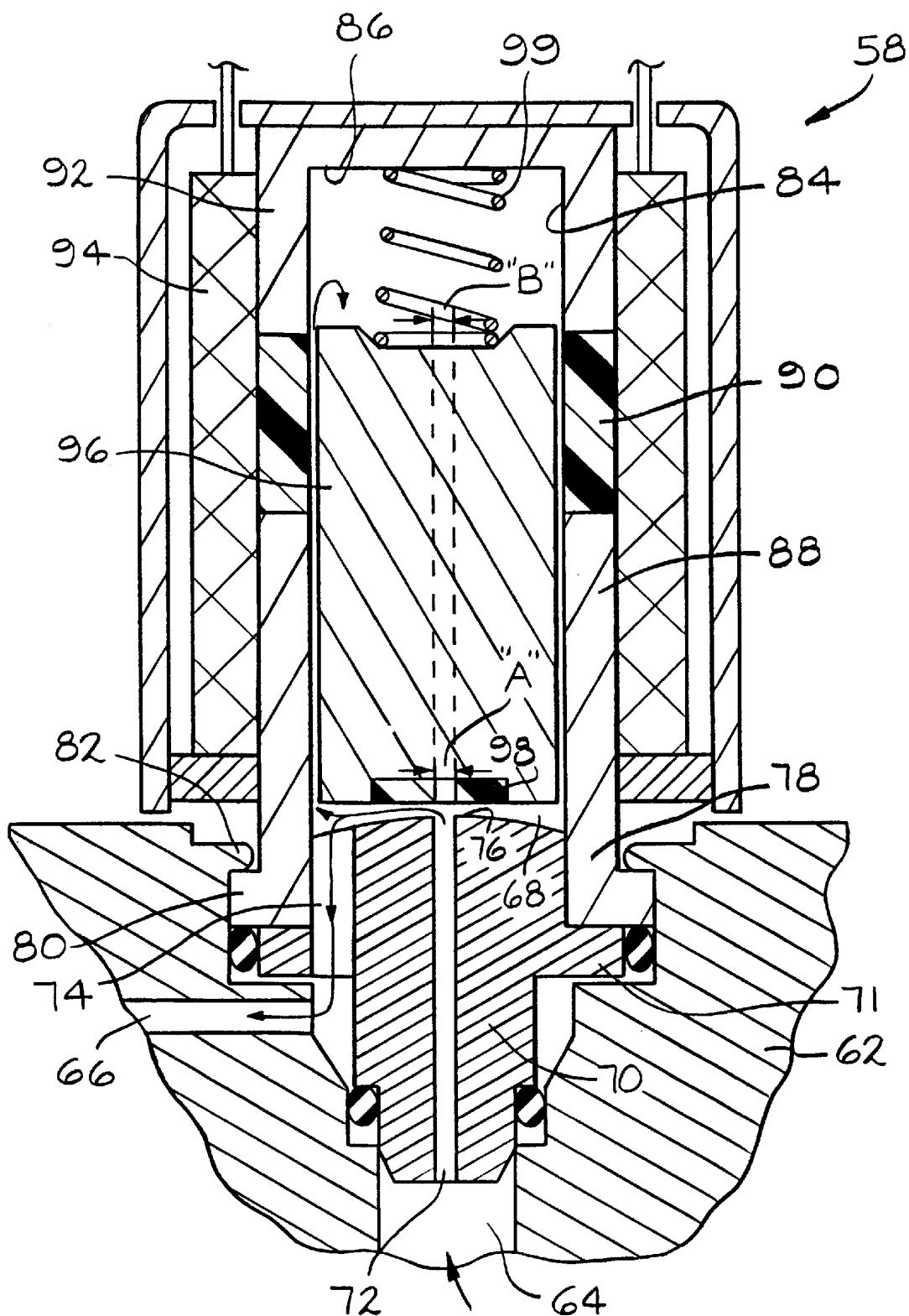
FIG. 2 is a cross-sectional view of a first embodiment of a proportional pressure differential solenoid valve which may be suitably used in the brake system 10 of FIG. 1.

FIG. 2 is a cross-sectional view of a first embodiment of a proportional pressure differential solenoid valve which may be suitably used as an apply valve 58 in the brake system 10. The embodiment of the apply valve 58 illustrated in FIG. 2 includes a valve body 62 which defines a valve inlet 64, a valve outlet 66, and a chamber 68 in fluid communication with the inlet 64 and the outlet 66. A valve seat 70 is fitted in the chamber 68. The valve seat 70 has a circumferentially extending radial flange 71 defined on the outer surface thereof, which abuts a shoulder defining a portion of the chamber 68 to position the valve seat 70 in the chamber 68. The valve seat 70 has a longitudinal central bore 72 defined therethrough which is in fluid communication at a lower end (from the perspective viewed in FIG. 2) with the inlet 64, and which is in fluid communication at an upper end with the chamber 68. A second bore 74 is defined through the valve seat 70, parallel to, but radially offset from the bore 72. The bore 74 communicates at an upper end with the chamber 68, and at a lower end with the outlet 66. The upper end of the valve seat 70 is conical, forming a seating surface 76 about the opening of the central bore 72.

Butting against the flange 71 is an inverted cup-shaped pressure tube 78. The pressure tube 78 has a radially outwardly extending flange 80 extending circumferentially about the lower end (as viewed in FIG. 2) thereof. A flange 82 is formed on the valve body 62 which extends radially inwardly into the chamber 68. The flange 82 cooperates with the flange 80 to retain the end of the pressure tube 78 having the flange 80 in the chamber 68 of the valve body 62. The flange 71 on the valve seat 70 is captured between the flange 80 and the shoulder of the valve body 62 so as to be immobile in the chamber 62.

The pressure tube 78 has an elongate axial bore 84 having an open end adjacent the flange 80 and a closed upper end 86. The pressure tube 78 acts as a flux tube, and is preferably made of a magnetic lower portion 88, a non-magnetic central portion 90, and a magnetic upper portion 92 to achieve the desired magnetic action as will be described below.

An electrical coil 94 is disposed about the pressure tube 78 and is selectively electrically energized by the ECU 36 (FIG. 1). An armature 96 is reciprocably disposed in the bore 84 of the pressure tube. A valve disk 98, preferably formed of a hard plastic or other suitable material is retained in a recess formed in the lower end (as viewed in FIG. 2) of the armature 96. A spring 99 is disposed in the bore 84 and acts between the closed end 86 and the upper end of the armature 96 to urge the armature 96 toward the valve seat 70, and the valve disk 98 into sealing engagement with the seating surface 76 of the valve disk 70. With the valve disk 98 contacting the seating surface 76 of the valve disk 70, the apply valve 58 is shut, and no hydraulic communication between the inlet 64 and the outlet 66 is prevented through the apply valve 58.

When the coil 94 of the apply valve 58 is energized, a magnetic force is exerted on the armature 96 which tends to move the armature 96 toward the closed end 86 of the bore 84, drawing the valve disk 98 out of engagement with the valve seat 70, opening the apply valve 58. Pressurized hydraulic fluid from the header 47 (FIG. 1) enters the inlet 64, passes through the bore 72 through the valve disk 70, through the gap between the valve disk 98 and the valve seat 70 and into the chamber 68. The pressurized hydraulic fluid flows out of the outlet 66 to the associated wheel brake 12 (FIG. 1). The pressurized hydraulic fluid also passes between a clearance between the armature 96 and the pressure tube 78. Thus the pressurized hydraulic fluid in the chamber 68 and bore 84 acts on both axial ends of the armature 96. A differential pressure may exists across the armature 96, due to throttling effects of the valve 58 as the pressurized hydraulic fluid passes through the relatively tight gap between the disk 98 and the sealing area 76 of the valve seat 70. The pressure in the chamber 68 acts on the entire lower face of the armature 96, except for a valve area "A" of the armature 96 directly over the bore 72 through the valve seat 70. The fill, unthrottled hydraulic pressure of the header 47 acts on the valve area "A" of the armature 96 directly over the bore 72 through the valve seat 70. In contrast, the entire upper face of the armature 96, including an area "B", equal in size to the valve area "A", is acted on by the pressure of the hydraulic fluid in the bore 84, which may be considered equal to the pressure in the chamber 68. If the pressure acting on the valve area "A" is different than the pressure acting on the area B, a differential pressure will exist across the armature 96, resulting in unbalanced forces tending to move the armature in a direction away from the higher pressure.

The forces acting on the armature 96 may be summarized as follows:

$$F_{magnetic} + (P_{inlet} \times A) = F_{spring} + (P_{outlet} \times B)$$

where $F_{magnetic}$ is the force exerted on the armature 96 by the magnetic field of the coil 94;

$P_{inlet}$ is the pressure at the inlet 64, which acts on the area "A"; and

A is the area of the valve area "A";

$F_{spring}$ is the force exerted on the armature 96 by the spring 99;

$P_{outlet}$ is the pressure at the outlet 66, which is the pressure in the chamber 68, which acts on the area "B"; and B is the area of the valve area "B";

Substituting A for the equivalent area B, and factoring terms, we get:

$$F_{magnetic} - F_{spring} \cong A(P_{outlet} - P_{inlet})$$

Rearranging the equation, we get:

$$P_{outlet} = P_{inlet} + \left( \frac{F_{magnetic} - F_{spring}}{A} \right)$$

Recognizing that A is a constant, for any given $P_{inlet}$ it will be recognized that $P_{outlet}$ is a function of $F_{magnetic}$:

$$P_{outlet} = f(F_{magnetic})$$

Since the $F_{magnetic}$ is proportional to the current applied to the coil 94, and knowing the pressure in the header 47 from the pressure transducer 52, the ECU 36 can calculate the current necessary to be applied to the coil 94 to achieve a desired pressure at the outlet 66 of the apply valve 58 and thus to the wheel brakes 12.

The operation of the brake system 10 will now be explained. During normal braking, as the brake pedal 18 is pushed down by the driver, the brake pedal position is sensed by the LVDT 22 and inputted to the ECU 36. The ECU 36 sends a current to energize each apply valve 58 to cause pressurized hydraulic fluid be supplied to the associated wheel brake 18 at a pressure that is a desired function of the position of the brake pedal 18. This pressure is applied to the associated wheel brake 18, through the open associated isolation valve 56, fed back to the master cylinder 16.

The pressure outputted from the apply valve 58 is incrementally greater than the pressure that would be supplied by the master cylinder 16 functioning alone. Therefore, while hydraulic fluid displaced from the master cylinder 16 is sent to the wheel brakes 12, the apply valves 58 amplify this displacement by sending additional fluid to the wheel brakes 12.

An example of the operation of the brake system 10 of the present invention is as follows. During normal brake apply (brake actuation in which the brake system does not enter into an anti-lock, traction control, or vehicle stability control mode) the isolation valves 56 remain open. The driver of the vehicle depresses the brake pedal 18, for example, to the 50 percent stroke position. The LVDT 22 senses the position of the brake pedal 18 and transmits this information via the pedal position signal to the ECU 36. The ECU 36 sends a control signal to actuate the apply valves 58 with a current whose amperage is a function of the pedal position and determined according to a preprogrammed algorithm. The control signal current may be proportional to the position of the brake pedal 18 or related to the position of the brake pedal 18 by any suitable function. When the pressure at a wheel brake 12 reaches the desired pressure, the associated apply valve 58 is shut by the combination of spring force from the internal spring 99 and differential pressure forces acting on the valve armature 96. Optionally, an additional pressure transducer may be provided to monitor the pressure supplied to each of the wheel brakes 12. Such pressure transducers can verify that the pressure of the associated apply valve 58 is properly proportional to the current supplied to the apply valve 58 to achieve a demanded target pressure at the associated wheel brake 12. If an excessive difference between demanded target pressure and measured pressure at a wheel brake 12 is maintained for a predetermined period, a warning may be sent to the driver. The control scheme for the apply valve 58 may also suitably be altered to vary the current supplied to the associated apply valve 58 as required to cause the pressure measured by the pressure transducer at the wheel brake 12 to match the demanded target pressure, if an automated check indicates that the pressure transducer is likely to be reading properly.

As indicated above, preferably the apply valves 58 are normally closed valves so that the apply valves 58 can be deenergized once the demanded target pressure at the associated wheel brakes 12 has been reached, and remain deenergized as long as the position of the brake pedal 18 remains approximately the same. Note that if no individual pressure transducers are provided for monitoring pressure at each wheel brake 12, the ECU 26 may programmed to deenergize an apply valve 58 after a predetermined time period which is calculated to be sufficient to permit the demanded target pressure to be achieved.

If the driver changes the position of the brake pedal 18 to a more depressed pedal position, for example, from the 50 percent stroke position to the 75 percent stroke position, the LVDT 22 senses the pedal movement and signals the ECU 36. The ECU 36 then energizes the apply valves 58 until the outlet pressure of the apply valves 58 reaches the corresponding new target pressure. The apply valves 58 are then shut.

When the brake pedal 18 is released, the ECU 36 energizes the dump valves 60, to release pressure supplied to the wheel brakes 12 based on the new position of the brake pedal 18. The pressure supplied to the wheel brakes 12 is also decreased due to the movement of the brake pedal 18 allowing the pistons (not shown) of the master cylinder 16 to retract, thereby permitting fluid to flow from the wheel brakes 12 back through the open isolation valves 56 to the master cylinder 16.

Other prior art electro-hydraulic brake-by-wire brake systems typically isolate the master cylinder from the wheel brakes during normal braking and then use a pump to supply hydraulic fluid to the brakes. However, the brake system 10 of the present invention utilizes the pump 44 to amplify the amount of fluid supplied to the wheel brakes 12 with the master cylinder 16 remaining in fluid communication with the wheel brakes 12, and acting in parallel to the pump 44. This provides some important system advantages.

Among the advantages of the brake system 10 is that, because the master cylinder 16 remains in fluid communication with the brakes during every initial brake application, the brake pressure of the wheel brakes 12 is automatically balanced. Furthermore, because pressures are balanced during part of every brake application, any and all brake pressure transducers can be calibrated with an ECU logic sequence at each brake application. This eliminates the effects of output variations from pressures transducer-to-transducer and variations with temperature and time. These are significant real system problems.

Brake pressure release is similar to brake apply and is controlled by the proportional release dump valves 60.

Note that the apply valves 58 are preferably energized only during periods of increasing pressure, and the proportional dump valves 60 are preferably energized only during periods of decreasing pressure. Thus, during long periods of time in which brake pressure is held constant, such as at long stops for traffic lights, or when braking on long downhill mountain grades, the solenoid valves 58 and 60 do not consume power or generate excessive heat (which can reduce component lifetime).

During non-normal braking, such as during ABS, TC, or VSC operation, the isolation valve(s) 56 of the controlled wheel(s) are energized to isolate the wheel brake(s) 12 of the controlled wheel(s) from the pressure developed in the master cylinder 16. Pressure in the wheel brake(s) 12 is then controlled by the respective proportional apply valves 58 and dump valves 60 to achieve the desired braking effect.

In normal braking, the pressure at the wheel brakes 12, and via the open isolation valves 56, in the master cylinder 16 is controlled by operation of the apply valves 58 and the dump valves 60. The pressure in the master cylinder 16 determines the reaction force felt by the driver when stepping on the brake pedal 18. The pressure at the wheel brakes 12 is controlled by the ECU 36 based on the position of the brake pedal 18. Thus the ECU 36 operates the pump 44, the apply valves 58 and the dump valves 60 to control the pedal force versus pedal position characteristics (pedal feel) experienced by the driver when stepping on and releasing the brake pedal 18. During operation of the brake system 10 in advanced control schemes such as ABS, TC, and VSC, the isolation valves 56 may operated in conjunction with the apply valves 58 and the dump valves 60 as required to control pressure in the master cylinder 18. For example, if the brake system 10 is operating in the VSC mode, assume the driver is attempting to move the brake pedal 18 from a first depressed position, to a second, further depressed position. It is anticipated that the pedal feel characteristics may be varied dependent on the mode of operation of the brake system 10. If the isolation valves 56 all remain shut, the brake pedal 18 will not move substantially, regardless of the force applied to the brake pedal 18. This may be the desired pedal feel characteristic in such a mode of operation. However, if it is desired to allow the brake pedal 18 to move somewhat in this condition, to give a different pedal feel, the dump valve 60 and the isolation valve 56 for one or more wheel brakes 12 may be simultaneously opened to permit displacement of fluid from the master cylinder 16, while maintaining pressure at the wheel brake 12 constant a desired pressure. Similarly, if the driver wishes to partially release the brake pedal 18, the apply valve 58 and the isolation valve 56 for one or more wheel brakes may be simultaneously opened to permit fluid to flow from the header 47 to the master cylinder 16, allowing the pedal 18 to retract with the proper reaction force on the driver's foot, while maintaining a desired pressure at the wheel brakes 12. Thus the ECU 36 can operate the pump 44, the isolation valves 56, the apply valves 58 and the dump valves 60 to control the pedal force versus pedal position characteristics (pedal feel) experienced by the driver when stepping on and releasing the brake pedal 18 in all non-failure modes of operation of the brake system 10.

The brake system 10 can apply a braking force in the event of an electrical failure. Since the isolation valves 56 are normally open, and the apply valves 58 and the dump valves 60 are normally closed, a path for the flow of pressurized hydraulic fluid between the master cylinder 16 and the wheel brakes 12 remains open during a loss of electric power. The driver can apply the wheel brakes 12 entirely manually by stepping on the brake pedal 18 and actuating the master cylinder 16 to supply pressurized hydraulic fluid to the wheel brakes 12 through this open path.

Among the advantages of the brake system 10 are that the need for large mechanical pedal simulators is eliminated, compared to proposed brake-by-wire system such as those shown in the German patent application DE 4413579 A1. The brake system 10 provides for electronically controlled pedal simulation. Within system limits, any desired pedal pressure vs. pedal travel performance curve can be obtained.

The brake system 10 does not require the use of spool valves for controlling pressure at the wheel brakes 12, thereby avoiding spool valve leakage. At 220 bar, four typical spool valves would require over 300 watts of average power to the system pump motor 46 to compensate for spool valve leakage whenever the brakes (however lightly) are applied. This proposed system does not require the use of spool valves and thus avoids this problem. Also, spool valves are sensitive to contaminants in the hydraulic fluid. The contamination sensitive spool valves can be replaced with contamination resistant proportional poppet valves, thus increasing braking system reliability. Furthermore, power consumption by the system's valves is relatively low. This is because the proportional solenoids (for the apply valves 58 and the dump valves 60) are energized only during periods of pressure change and the isolation solenoid valves are energized only during non-normal braking. Furthermore, with previously proposed systems, the hydraulic energy of the pedal simulator is wasted during each normal brake application. With the proposed system, the mechanical pedal simulator is eliminated and the hydraulic work of the master cylinder 16 is used in applying the wheel brakes 12. This means that the pump 44 can be cycled less often.

Because each proportional valve is used in one direction only (either pressure increasing or pressure decreasing), magnetic and mechanical hysteresis are greatly reduced. This allows for more precise brake pressure control. Another advantage is that, because the master cylinder 16 connects brake pairs (e.g., the pair of wheel brakes 12 connected to the primary circuit 26 and the pair of wheel brakes 12 connected to the secondary circuit 26) during normal braking, pair brake balance is automatic. Indeed, during normal braking, the pressures in the primary circuit 26 and the secondary circuit 28 are substantially equalized by the pressures thereof acting through the secondary piston of the master cylinder 16. Similarly, because brake pressures are balanced, each pressure transducer in the brake system 10 can be calibrated with respect to each other using an ECU logic sequence at each brake application.

Figure 2A:
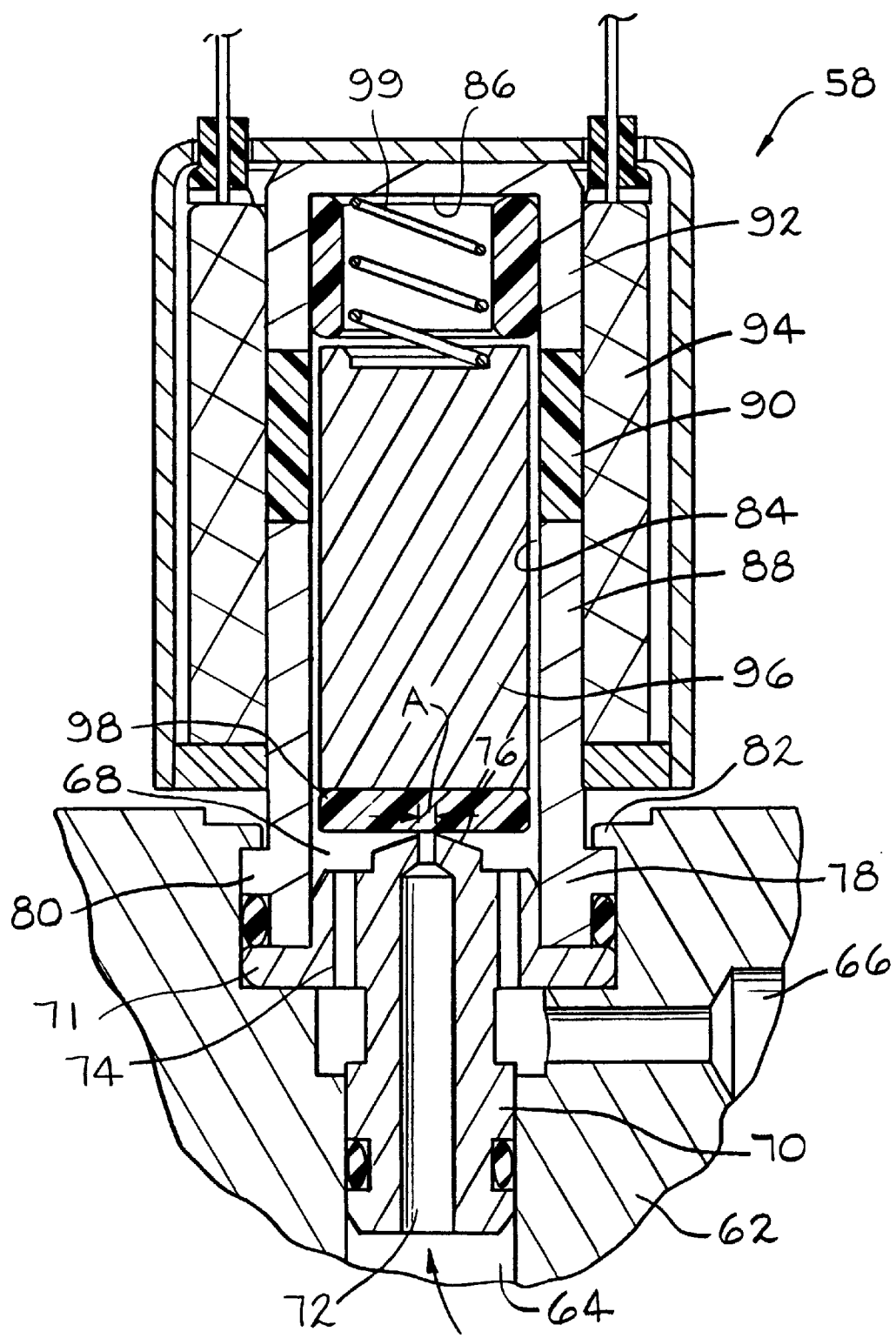
FIG. 2A is a view similar to FIG. 2, but illustrating a second embodiment of a pressure differential solenoid valve.

FIG. 2A is a cross-sectional view of a second embodiment of a proportional pressure differential solenoid valve which may be suitably used as an apply valve 58 in the brake system 10 of the present invention. It will be noted that the valve illustrated in FIG. 2A is generally similar in structure and function to the valve illustrated in FIG. 2. Accordingly, the same reference numbers are used for parts with corresponding functions.

Two differences between the valves of FIG. 2 and FIG. 2A are the structures of the valve seat 70 and the pressure tube 78, with respect to the location of the O-rings providing pressure sealing to the valve body 62. Also it will be noted that the valve disk 98 in FIG. 2A covers the full lower face of the armature 96. A structural difference between the valves illustrated in FIG. 2 and FIG. 2A is that the valve in FIG. 2A is provided with a ring 100, which is disposed in the bore 84 about the spring 99. The ring 100 is disposed between the closed end 86 of the bore 84 and the armature 96, and therefore limits the range of motion of the armature 96.

Figure 3:
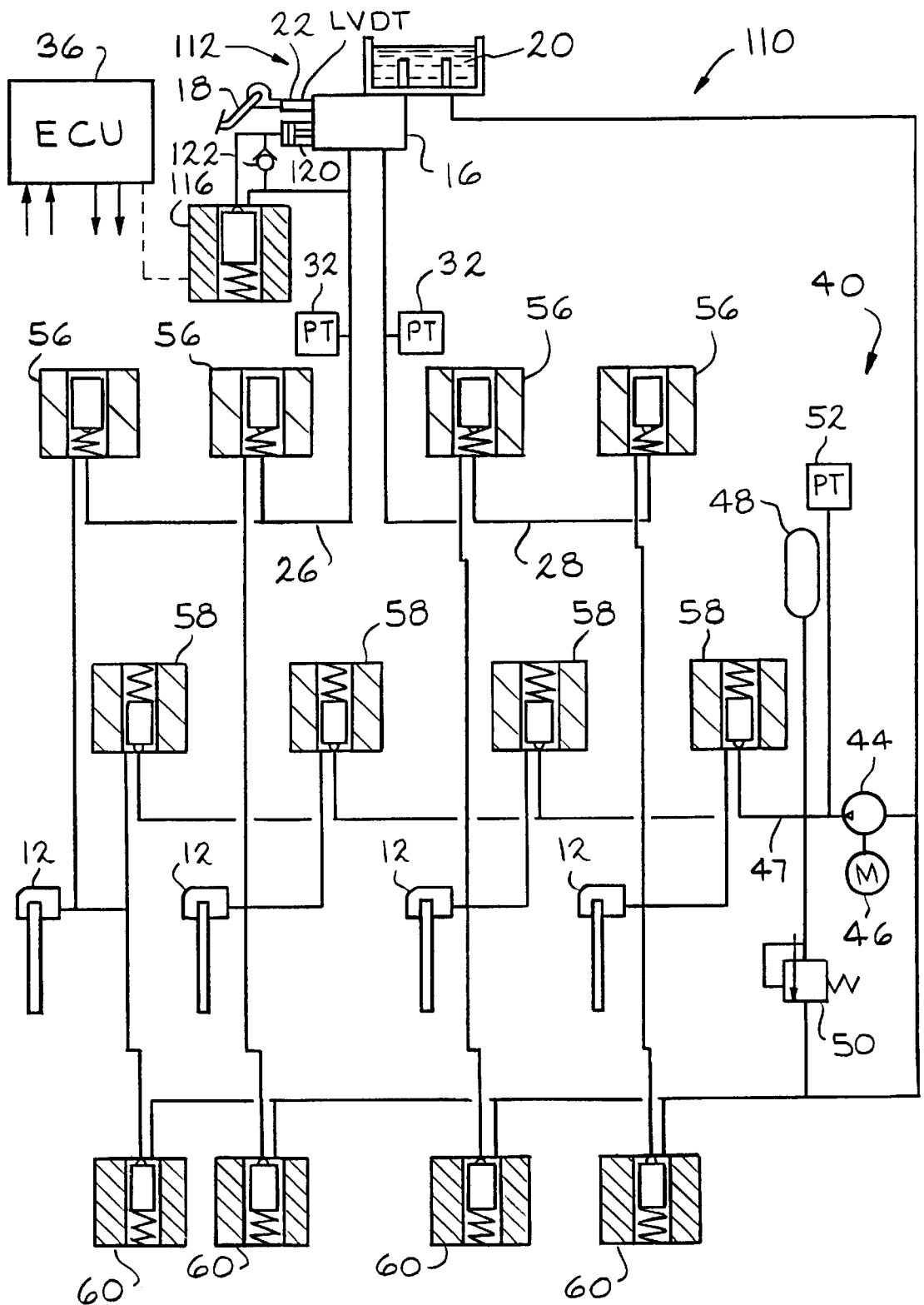
FIG. 3 is a view similar to FIG. 1, but illustrating a second embodiment of the brake system according to the invention, having a pressure feedback section for electronic boost.

FIG. 3 is a schematic illustration of a second embodiment of a vehicle brake system according to the invention, indicated generally at 110. The brake system 110 is an electrohydraulic brake-by-wire system with both electronic pedal simulation and electronic boost. The brake system 110 has several components which are similar in structure and function to components of the brake system 10, and such components are indicated by the use of the same reference number. Like the brake system 10, the brake system 110 contains components which enable electronic pedal simulation, thus eliminating the need for a large mechanical pedal simulator section and the associated mechanical hysteresis. The ECU 36 controls the pedal force versus pedal travel characteristics to provide any pedal feel characteristic which is desired. The energy applied to the brake pedal 18 is sent directly to the wheel brakes 12 to do useful work, thus reducing system energy waste and requirements. Preferably, the isolation valves 56 are normally open, and the apply valves 58 and the dump valves 60 are normally closed.

As shown in the system diagram of FIG. 3, the brake system 110 has a dual circuit master cylinder 16 with a pedal position sensor (LVDT 22) and a pressure feedback section, indicated generally at 112. This feedback section 112 consists of a proportional control solenoid feedback valve 116 and a small hydraulic cylinder area 120 in the master cylinder 16 in series with a spring. The displacement amplification source 40 includes the motor driven hydraulic pump 44 with the accumulator 48 and the relief valve 50. Note that, like the brake system 10, no accumulator isolating valve is needed between the accumulator 48 and the header 47 because the isolation valves 56, apply valves 58 and dump valves 60 are high sealing force poppet valves rather than spool valves. Thus, comparatively little pressure leakage is experienced in the brake system 110.

The operation of the brake system 110 during normal braking will now be explained. As the brake pedal 18 is pushed down, the hydraulic fluid displaced by the master cylinder 16 is sent to the wheel brakes 12, and the position of the pedal 18 is sensed by the LVDT 22 and inputted to the ECU 36. The ECU 36 sends a current to the apply valves 58 to cause an output pressure that is a desired function of pedal displacement. This output pressure is fed to each controlled wheel brake 12 and may be fed back as required to the master cylinder 16 through the isolation valves 56, which remain deenergized and open during normal braking. Thus, the displacement amplification source 40 amplifies the displacement of the master cylinder 16 in that more pressurized hydraulic fluid is supplied to the wheel brakes 12 than is generated in the master cylinder 16. Once the desired output pressure is reached, the apply valves 58 shut and are deenergized.

Simultaneously, the ECU 36 sends a separately controlled current to the proportional feedback solenoid of the feedback valve 116, as illustrated by the dashed line in FIG. 3. The hydraulic fluid at the inlet to the feedback valve 116 is pressurized by both the output of the master cylinder 16 and the pressurized hydraulic fluid at the vehicle brakes 12, which is connected thereto through the open isolation valves 56. The solenoid opens to supply this pressurized fluid to the hydraulic cylinder area 120 of the master cylinder 16. This causes a feedback pressure to be applied to the master cylinder 16 which generates a force which adds to or assists the driver applied pedal force. This assisting force is controlled by the ECU 36 to provide any logically obtainable, customer desired, pedal force versus pedal travel (pedal feel) characteristic.

If desired, the brake system can include an optional check valve 122 positioned between the outlet of the master cylinder 16 and the inlet of the hydraulic cylinder area 120 of the master cylinder 16. The check valve 122 prevents fluid from flowing directly from the outlet of the master cylinder 16 to the inlet of the hydraulic cylinder area 120, but allows fluid to flow out of the hydraulic cylinder area 120 into the primary brake circuit 26. The check valve 122 provides for a secondary or alternate return fluid path from the hydraulic cylinder 120 to help assure that the master cylinder 16 fully returns to its normal unactuated position in case of a failure of the feedback valve 116 or other component of the brake system 110, such as the feedback valve 116 remaining in a closed position due to a valve malfunction, an ECU 36 signal malfunction, and/or contamination in the feedback valve 116.

As an option, in place of the proportional feedback valve described above for use as the feedback valve 116, a non-proportional, binary feedback solenoid valve can be used as the feedback valve 116. Binary valves, as used in the application, means that the valve is operated to be either in the fully open position or the fully shut position, and is not operated to maintain a throttled position between the filly open and fully shut positions. Such a binary feedback valve 116 could be operated by the ECU 36 to provide a fixed level feedback force boost.

Brake pressure release is similar, but is controlled by the dump valves 60. The dump valves 60 are energized to reduce pressure at the wheel brakes 12 to a desired level, then deenergized to hold that pressure.

During ABS, TC, and VSC operation, the isolation solenoid valve(s) 56 of the controlled wheel brake(s) 12 are energized to isolate the controlled wheel brake(s) from pressurized hydraulic fluid in the master cylinder 16. Wheel brake pressures are then controlled by the respective proportional apply valves 58 and dump valves 60 under the direction of the ECU 36 to achieve the desired braking effect In addition to the system advantages described above with respect to the brake system 10, the brake system 110 has electronically controlled pedal simulation and boost. Within system limits, any customer desired pedal force and fluid displacement verses pedal travel (pedal feel) can be obtained and electronically controlled. It is noted that the brake system 110 is adaptable to many vehicle size and performance requirements by simply adjusting the software programming of the ECU 36.

Figure 4:
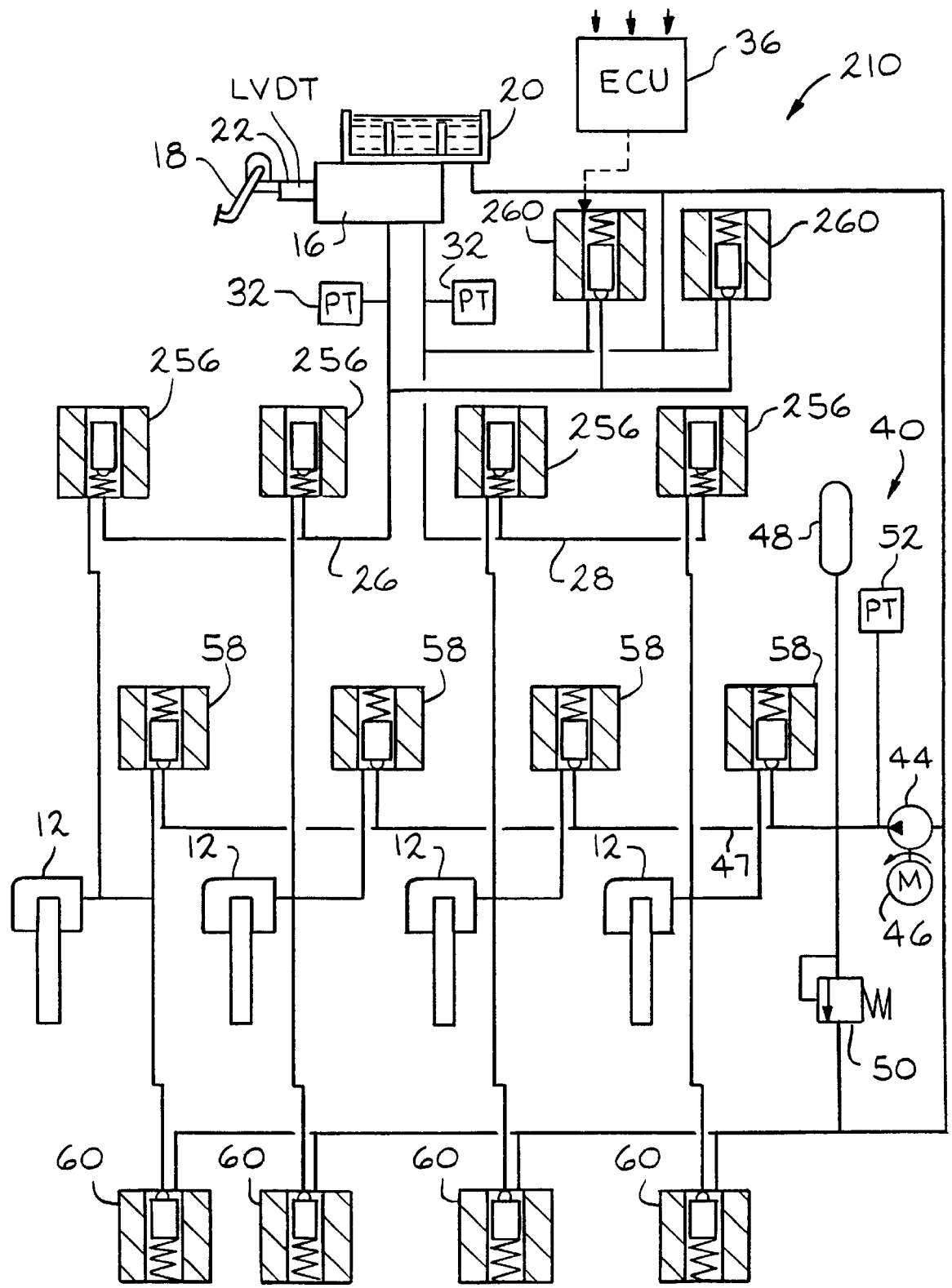
FIG. 4 is a view similar to FIG. 1, but illustrating a third embodiment of the brake system according to the invention, having two proportional boost control valves.

FIG. 4 is a schematic illustration of a third embodiment of a vehicle brake system, indicated generally at 210. The brake system 10 is an electro-hydraulic brake-by-wire brake system similar in structure to the brake system 10 of FIG. 1 and brake system 110 of FIG. 3. The same reference numbers will be utilized to indicate components of the brake system 210 which are similar in structure and function to components of the brake systems 10 and 110.

The brake system 210 includes four isolation valves 256 which are preferably proportional valves. Preferably, the isolation valves 256 are normally open when not actuated, thereby providing a fluid path from the master cylinder 16 to the wheel brakes 12 in case of electrical failure. The brake system 210 also includes four proportional apply solenoid valves 58 and four proportional dump solenoid valves 60 which are all preferably normally closed. The brake system 210 incorporates two proportional boost control valves 260 connected to the primary circuit 26 and secondary circuit 27 of the master cylinder 16.

During normal brake apply, the LVDT 22 senses movement of the brake pedal 18 and the ECU 36 actuates the isolation valves 56 to a closed position, thereby isolating the pressure from the master cylinder 16 to the vehicle brakes 12. The ECU 36 also outputs a signal to the solenoids of the apply valves 58 to output a pressure that is a desired function of the brake pedal 18 position. Since the master cylinder 16 is isolated, the proportional boost control valves 260 are controlled to release fluid pressure from the master cylinder 16. The proportional boost control valves 260 can be controlled to provide for any desired pedal travel vs. brake force characteristic. During normal brake release, the ECU 36 outputs a signal to the solenoid of the isolation valves 256 to allow fluid to flow into the master cylinder 16 at a pressure which is a desired function of the brake pedal 18 position. During normal brake release, the proportional boost control valves 260 may or may not be controlled to an open position depending on the characteristics of the brake release demand sensed by the LVDT 22 and the pressure of the hydraulic fluid entering the master cylinder 16 as sensed by the pressure transducers 32.

As indicated above, the isolation valves 256 are preferably proportional solenoid valves. If the isolation valves 256 are proportional solenoid valves, the pressure transducers 32 in fluid communication with the outlet of the master cylinder 16 can be eliminated from the brake system 210. The ECU 36 can monitor the current supplied to the solenoids of the isolation valves 256 and the solenoids of the proportional boost control valves 260 to determine the outlet pressure of the master cylinder 16.

During an ABS operation, the appropriate proportional apply valves 58 and proportional dump valves 60 are controlled to modulate pressure at the associated wheel brake 12 according to the programmed ABS control scheme. During a traction control event in which one of the vehicle brakes 12 is to be actuated, the appropriate isolation valve 256 is controlled to a closed position. The associated proportional apply valve 58 is controlled independently of the measurements from the LVDT 22 to supply hydraulic fluid at a desired pressure to the vehicle wheel 12. Note that the remaining proportional apply valves 58 are actuated to a closed position.

Instead of having two proportional boost valves 260, one for each of the two hydraulic circuits in fluid communication with the master cylinder 16, a single proportional boost valve 260 can be used in the brake system of FIG. 4. If desired, a proportional boost valve 260 can be used in fluid communication with only one of the conduits (the primary circuit 26 or the secondary circuit 28) in fluid communication with the master cylinder 16.

Figure 4A:
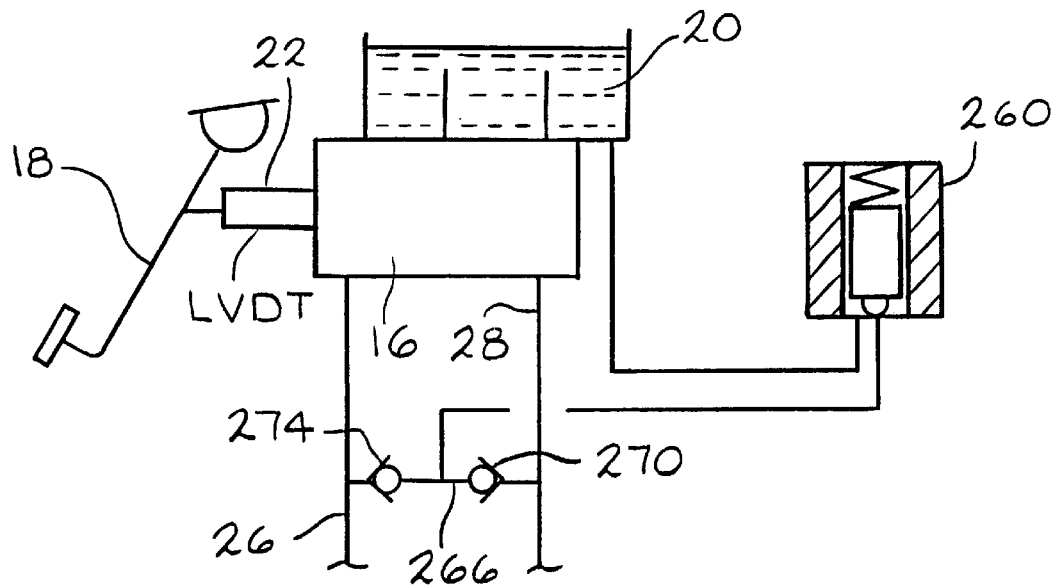
FIG. 4A illustrates a modification to the vehicle brake system 10 of FIG. 4 utilizing a single proportional boost control valve.

More preferably, a single proportional boost valve 260 will be in fluid communication with both of the primary circuit 26 and the secondary circuit 28. An example of such an arrangement is illustrated in FIG. 4A as a modification of the brake system 210. The brake system of FIG. 4A includes a proportional boost valve 260 which is preferably normally closed. A conduit 266 is in fluid communication with the primary circuit 26 and the secondary circuit 28 of the master cylinder 16. A check valve 270 is located within the conduit 266 which prevents fluid flow from the primary circuit 26 to the secondary circuit 28. A check valve 274 is also located within the conduit 266 which prevents fluid flow from the secondary circuit 28 to the primary circuit 26. Thus, the check valves 270 and 274 prevent fluid flow between the primary circuit 26 and the secondary circuit 28, thereby maintaining the redundancy and reliability of the brake system 210. The input port of the single proportional boost valve 260 is in fluid communication with the conduit 266 between the check valves 270 and 274. The output port of the proportional boost valve 260 is in fluid communication with the reservoir 20. The single proportional boost valve 260 is controlled in generally the same manner as the two independent proportional boost valves 260 of the brake system of FIG. 4, as described above, to provide for any desired pedal travel vs. pedal force (pedal feel) characteristic. Thus, the single proportional boost valve 260 is used to control the dump pressure of both the primary circuit 26 and the secondary circuit 28. The check valves 270 and 274 prevent a failure or malfunction of one of the primary circuit 26 and the secondary circuit 28 circuit would not affect the other of the primary circuit 26 and the secondary circuit 28.

Figure 4B:
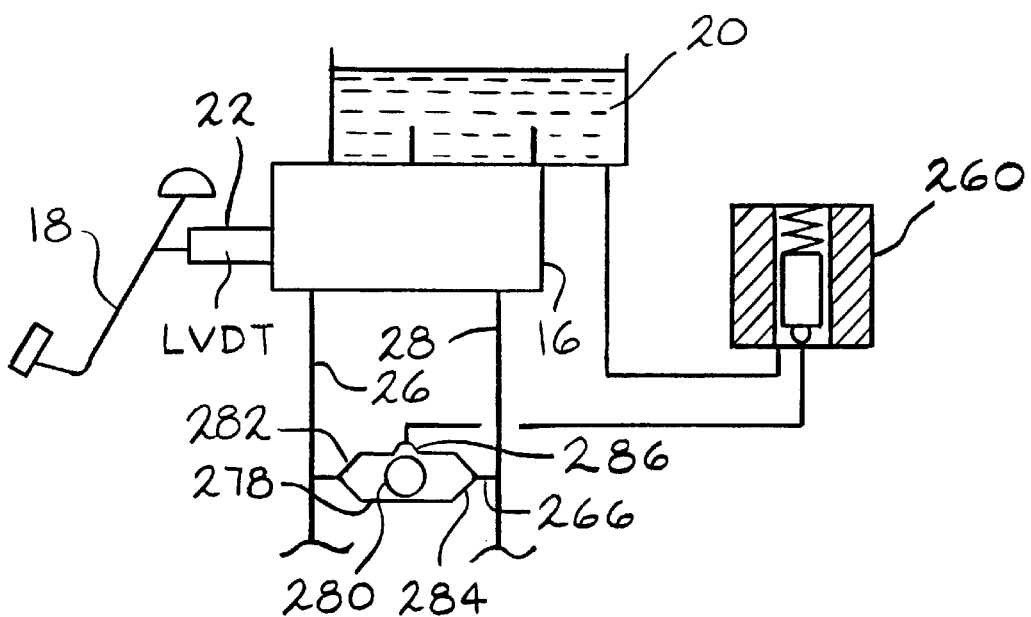
FIG. 4B is a view similar to FIG. 4A, but illustrates an alternate modification to the vehicle brake system 10 of FIG. 4 utilizing a single proportional boost control valve.

Instead of using the two separate check valves 270 and 274, a double check valve 278 can be used, as illustrated in FIG. 4B. The double check valve 278 is located within the conduit 266 communicating with the primary circuit 26 and the secondary circuit 28. The check valve 278 has a single ball 280 and two opposed ball seats 282 and 284. Each ball seat 282 and 284 has an associated port in communication therewith. The check valve 278 also has a single central outlet port 286 in fluid communication with the inlet of the proportional boost valve 260. The double check valve 278 allows the hydraulic fluid from the port of the ball seats 282 and 284 having the highest pressure to flow to the outlet port while automatically sealing off the port of the other ball seat 282 and 284, to prevent the higher pressure hydraulic fluid in the double check valve 278 from flowing into the brake circuit 26, 28 with the lower pressure.

The proportional boost valve 260 could be replace with a binary valve. Any tendency to a difference in pressure decay between the primary circuit 26 and the secondary circuit 28 caused, for example, by different volumes, spring rates, or different components of the brake system, would be compensated for by the shuttling of the ball 280 within the double check valve 278, thereby causing equal dumping between the primary circuit 26 and the secondary circuit 28.

Figure 5:
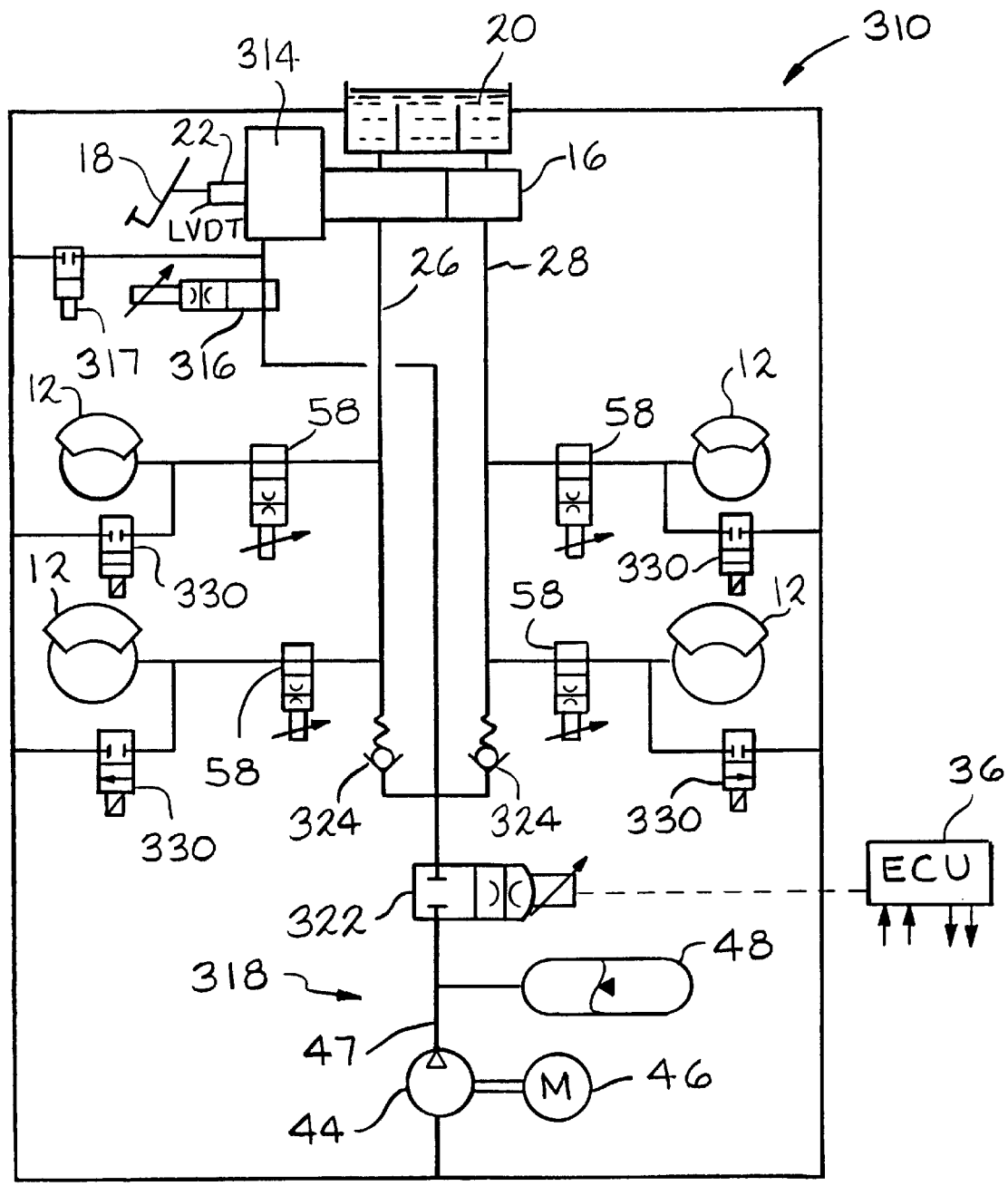
FIG. 5 is a view similar to FIG. 3, but illustrating a fourth embodiment of the brake system according to the invention, having a boost feedback feature.

FIG. 5 is a schematic diagram of another embodiment of a brake system according to the invention, indicated generally at 310 and having a boost feedback feature. As shown in the system diagram of FIG. 5, the proposed system 310 is an electro-hydraulic brake-by-wire brake system having many components which are similar in structure and function to corresponding components of the brake systems 10, 110, and 210, and such components will be indicated by use of the same reference number therefore. The brake system 310 has a dual circuit master cylinder 16 with a pedal position LVDT 22, a boost chamber 314 acting to assist the driver in applying a braking force to the master cylinder 16 when supplied with pressurized hydraulic fluid, and a proportional solenoid feedback valve 316 for selectively supplying pressurized hydraulic fluid to the boost chamber 314. A normally open, proportional relief valve 317 selectively prevents fluid communication from the boost chamber 314 to the reservoir 20 of the master cylinder 16.

A displacement amplification source 318 includes the electric motor 46 driving the hydraulic pump 44, the accumulator 48, and a proportional boost solenoid valve 322. The header 47 provides fluid communication between the outlet of the pump 44, the accumulator 48, and the inlet of the proportional boost solenoid valve 322. The outlet of the proportional boost solenoid valve 322 is in fluid communication with the primary circuit 26 via a check valve 324 which permits flow from the proportional boost solenoid valve 322 to the primary circuit 26, but prevents the flow of hydraulic fluid in the opposite direction. The outlet of the proportional boost solenoid valve 322 is also in fluid communication with the secondary circuit 28 via a second check valve 324 which permits flow from the proportional boost solenoid valve 322 to the secondary circuit 28, but prevents the flow of hydraulic fluid in the opposite direction. Finally, the outlet of the proportional boost solenoid valve 322 is in fluid communication with the inlet of the feedback valve 316.

The four proportional pressure differential solenoid valves (apply valves 58) control brake pressure to the respective wheel brake 12. Four binary solenoid dump valves 330 are in fluid communication between the respective wheel brakes 12 and the reservoir 20. Preferably, the apply valves 58 are normally open, and the proportional boost solenoid valve 322 and the dump valves 330 are normally closed.

The operation of the brake system 310 under normal operation will now be explained. Under normal brake apply as the brake pedal 18 is depressed, the pedal position is sensed by the LVDT 22 and sent to the ECU 36. The relief valve 317 is energized shut when the brake pedal 18 is being depressed. The apply valves 58 are preferably normally open in their unactuated position, thereby allowing fluid displaced by the master cylinder 16 to flow into the vehicle brakes 12. The dump valves 330 are in a closed position. The displacement amplification source 318 is activated and the ECU 36 sends a separately controlled current to the solenoid of the proportional boost valve 322 and the proportional solenoid feedback valve 316. The pressurized hydraulic fluid at the inlet to the feedback valve 316 is pressurized by the output of the proportional boost valve 322. This causes a feedback pressure to be applied to the master cylinder 16 which adds to or assists the driver applied pedal force. This force is software controlled to provide any logically obtainable, customer desired, pedal force versus travel characteristic. Preferably, the pressure from the outlet of the proportional boost valve 322 is approximately equal to the pressure from the outlet of the master cylinder 16. The pressure on either side of the check valves 324 is, therefore, approximately equal. Preferably, the cracking or opening pressure of the check valves 324 is relatively small, yet large enough to assure that the pressure from the outlet of the master cylinder 16 is applied to the vehicle brakes 12.

During brake release, the relief valve 317 is controlled by the ECU 36 to relieve pressure from the boost chamber 314 proportionally to the position of the brake pedal 18, thereby maintaining the desired pedal feel.

During ABS operation, the appropriate dump valve 330 is actuated to an open position to relieve the pressure from the associated vehicle brake 12. Simultaneously, the associated proportional apply solenoid valve 58 is controlled to actuate the vehicle brake 12 at a desired pressure. To compensate for the loss of fluid flowing through the proportional apply valve 58 from the master cylinder 16, the feedback valve 316 is controlled to lower the outlet pressure of the master cylinder 16. Since the pressure from the master cylinder 16 is lower than the pressure from the proportional boost valve 322, the associated check valve 324 opens to allow fluid from the proportional boost valve 322 to flow through the associated proportional apply solenoid valve 58 to the vehicle brake 12. Preferably, the cracking or opening pressure of the check valve 324 is less than the differential pressure acting on both sides of the check valve 324. The output pressure of the proportional boost valve 322 is typically proportional to the pedal position sensed by the LVDT 22, but can be reduced to reduce the pressure of the overall brake system 310, for example, when all four vehicle brakes 12 are undergoing an anti-lock brake operation.

During a traction control event in which one of the vehicle brakes 12 is to be actuated, the proportional boost valve 322 is controlled independently of the measurements from the LVDT 22 to apply pressure to the vehicle wheel 12 through the associated check valve 324 and the associated opened proportional apply solenoid valve 58. Note, the remaining proportional apply solenoid valves 58 are actuated to a closed position.

While the brake system of the invention has been described above as not requiring a mechanical pedal simulator, it is contemplated that the brake systems of this invention may be used with mechanical pedal simulators. The electronic pedal simulation described above may be used in parallel with the mechanical pedal simulator to, for example, vary pedal feel without mechanically altering the mechanical pedal simulator, or to achieve a finer control over pedal feel It is also anticipated that the valves associated with the various embodiments of the invention described above could be used with a mechanical pedal simulator without being operated to provide electronic pedal simulation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electro-hydraulic brake system comprising:
   a wheel brake;
   a reservoir of hydraulic fluid;
   a pump for selectively pumping hydraulic fluid from said reservoir and supplying pressurized hydraulic fluid to said wheel brake for applying a braking force during normal brake apply;
   an apply valve in fluid communication with said wheel brake for selectively permitting flow of pressurized hydraulic fluid from said pump to said wheel brake;
   a dump valve in fluid communication with said wheel brake for selectively permitting flow of pressurized hydraulic fluid from said wheel brake to said reservoir;
   a brake pedal;
   a master cylinder operated by said brake pedal for pressurizing hydraulic fluid;
   an isolation valve in fluid communication with said wheel brake for selectively permitting flow of pressurized hydraulic fluid from said master cylinder to said wheel brake;
   a sensor sensing the position of said brake pedal and generating a pedal position signal representative of the position of said brake pedal; and
   an electronic control unit for receiving said pedal position signal, said pedal position signal being utilized to determine a brake demand, said electronic control unit controlling the operation of said pump, and said apply, dump, and isolation valves to achieve a desired braking force at said wheel brake based on said brake demand and to regulate pressure generated by said master cylinder to achieve a predetermined relationship between pressure generated by said master cylinder and position of said brake pedal, whereby a desired pedal feel is achieved substantially continuously during brake apply.

2. The brake system of claim 1, wherein said isolation valve is a binary solenoid valve.

3. The brake system of claim 1, wherein said apply isolation valve is a proportional pressure differential solenoid valve.

4. The brake system of claim 1, wherein said dump valve is a proportional relief solenoid valve.

5. A brake system comprising:
   a brake pedal;
   a position transducer operatively connected to said brake pedal for generating a continuous brake position signal representative of the position of said brake pedal, proportionate to the travel of said brake pedal;
   a master cylinder being selectively actuated by said brake pedal;
   a wheel brake;
   a conduit in fluid communication with said master cylinder and said wheel brake;
   a pressure transducer for sensing the pressure within said conduit, said pressure transducer generating a pressure signal representative of the pressure within said conduit;
   an isolation valve for selectively preventing fluid flow between said master cylinder and said wheel brake;
   a source of pressure for supplying high pressure fluid to said wheel brake, said source being in fluid communication with said wheel brake and said conduit;
   an apply valve for selectively regulating the pressure of the hydraulic fluid supplied to said wheel brake from said source;

a dump valve for selectively relieving the pressure at said wheel brake; and an ECU for electrically controlling said isolation valve, said apply valve, and said dump valve in response to a comparison of said position signal and said pressure signal.

6. The brake system of claim 5, wherein said apply valve includes:

a housing having an inlet and an outlet;

an armature movably mounted in said housing;

a valve seat fixed in said housing, said valve seat having an opening therethrough in fluid communication with said inlet;

a valve disk on said armature, said valve disk disposed adjacent said opening in said valve seat, wherein the position of said valve disk relative to said opening in said valve seat regulates the flow of fluid from said inlet to said outlet;

a spring biasing said armature so that said valve disk is biased against said valve seat to block said opening in said valve seat; and an electrical coil positioned around said armature, said coil exerting a selectively variable magnetic force on said armature urging said armature to move away from said valve seat and compress said spring.

7. The brake system of claim 5, further including:

a hydraulic cylinder having first and second ports, said first port being in fluid communication with said master cylinder;

a proportional control solenoid valve having an inlet port and an outlet port, said inlet port being in fluid communication with said second port of said hydraulic cylinder, said outlet port being in fluid communication with an isolation valve; and a check valve for preventing fluid from entering said second port of said hydraulic cylinder from said master cylinder;

said ECU electrically controlling said isolation valve, said apply valve, said dump valve, and said proportional control solenoid valve in response to said position signal and said pressure signal.

8. The brake system of claim 5, further including a proportional boost valve for selectively applying fluid pressure to said conduit, said ECU electrically controlling said isolation valve, said apply valve, said dump valve, and said proportional boost valve in response to said position signal and said pressure signal.

9. The brake system of claim 8, further including a check valve for preventing fluid flow in a direction from said master cylinder to said proportional boost valve.

10. The brake system of claim 5, wherein said source of pressure also supplies high pressure fluid to said master cylinder, thereby assisting said master cylinder in supplying pressure to said wheel brake, the brake system further including:

a proportional boost valve for selectively regulating the pressure of the hydraulic fluid from said source;

a feedback valve for selectively regulating the pressure of the hydraulic fluid supplied to said master cylinder from said source; and a check valve for preventing fluid flow in a direction from said master cylinder to said proportional boost valve.

* * * * *